(12) United States Patent
Murayama et al.

(10) Patent No.: US 11,092,099 B2
(45) Date of Patent: Aug. 17, 2021

(54) CONTROL APPARATUS

(71) Applicant: DENSO CORPORATION, Kariya (JP)

(72) Inventors: Yuki Murayama, Kariya (JP); Ryozo Kayama, Kariya (JP); Yusuke Todo, Kariya (JP); Manabu Yoshidome, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 16/832,521

(22) Filed: Mar. 27, 2020

(65) Prior Publication Data

US 2020/0224600 A1 Jul. 16, 2020

Related U.S. Application Data

(63) Continuation of application No. PCT/JP2018/034455, filed on Sep. 18, 2018.

(30) Foreign Application Priority Data

Sep. 29, 2017 (JP) .............................. JP2017-190369

(51) Int. Cl.
  *F02D 41/14* (2006.01)
  *F01N 11/00* (2006.01)
  *G01N 27/41* (2006.01)
  *G01M 15/10* (2006.01)

(52) U.S. Cl.
  CPC ........ *F02D 41/1462* (2013.01); *F01N 11/002* (2013.01); *F01N 11/007* (2013.01); *G01N 27/41* (2013.01); *F01N 2560/026* (2013.01); *G01M 15/102* (2013.01)

(58) Field of Classification Search
  CPC ................. F01N 11/002; F01N 11/007; F01N 2560/026; F02D 41/1462; G01M 15/102; G01N 27/41
  See application file for complete search history.

(56) References Cited

U.S. PATENT DOCUMENTS

| 2007/0119437 A1* | 5/2007 | Hiraiwa | G01N 27/419 123/693 |
| 2017/0009685 A1* | 1/2017 | Sakashita | F02D 41/064 |
| 2017/0010236 A1* | 1/2017 | Sakashita | F01N 11/002 |
| 2017/0219516 A1* | 8/2017 | Toudou | G01N 27/4067 |

FOREIGN PATENT DOCUMENTS

JP 2009-257889 11/2009

* cited by examiner

*Primary Examiner* — Audrey K Bradley
(74) *Attorney, Agent, or Firm* — Nixon & Vanderhye P.C.

(57) ABSTRACT

It is to determine whether a temperature rise condition of a first cell or a second cell is satisfied based on whether a first parameter has exceeded a predetermined first threshold or a second parameter has exceeded a predetermined second threshold. After satisfaction of the temperature rise condition, it is to determine that an exhaust gas sensor is in an active state upon determination that a corresponding time condition is satisfied.

9 Claims, 14 Drawing Sheets

CONTROL APPARATUS

CROSS-REFERENCE TO RELATED APPLICATIONS

This application is a bypass continuation application of currently pending international application No. PCT/JP2018/034455 filed on Sep. 18, 2018 designating the United States of America, the entire disclosure of which is incorporated herein by reference. The internal application is based on and claims the benefit of priority from Japanese Patent Application No. 2017-190369 filed on Sep. 29, 2017, the entire disclosure of which is incorporated herein by reference.

TECHNICAL FIELD

The present disclosure relates to a control apparatus for an exhaust gas sensor.

BACKGROUND

An exhaust gas sensor for detecting components contained in an exhaust gas discharged from an internal combustion engine is configured to be converted into an active state when a predetermined condition is satisfied.

SUMMARY

A control apparatus for an exhaust gas sensor includes an activation determination unit configured to 1. Determine, based on whether a time condition corresponding to a temperature threshold is satisfied, whether the exhaust gas sensor is in an active state in which the exhaust gas sensor is capable of performing a measurement operation with at least a predetermined accuracy 2. Determine that the exhaust gas sensor is in the active state upon, after a temperature rise condition is determined to be satisfied, the time condition corresponding to the temperature threshold being satisfied

DESCRIPTION OF THE EMBODIMENTS

Viewpoint

Figure 1:
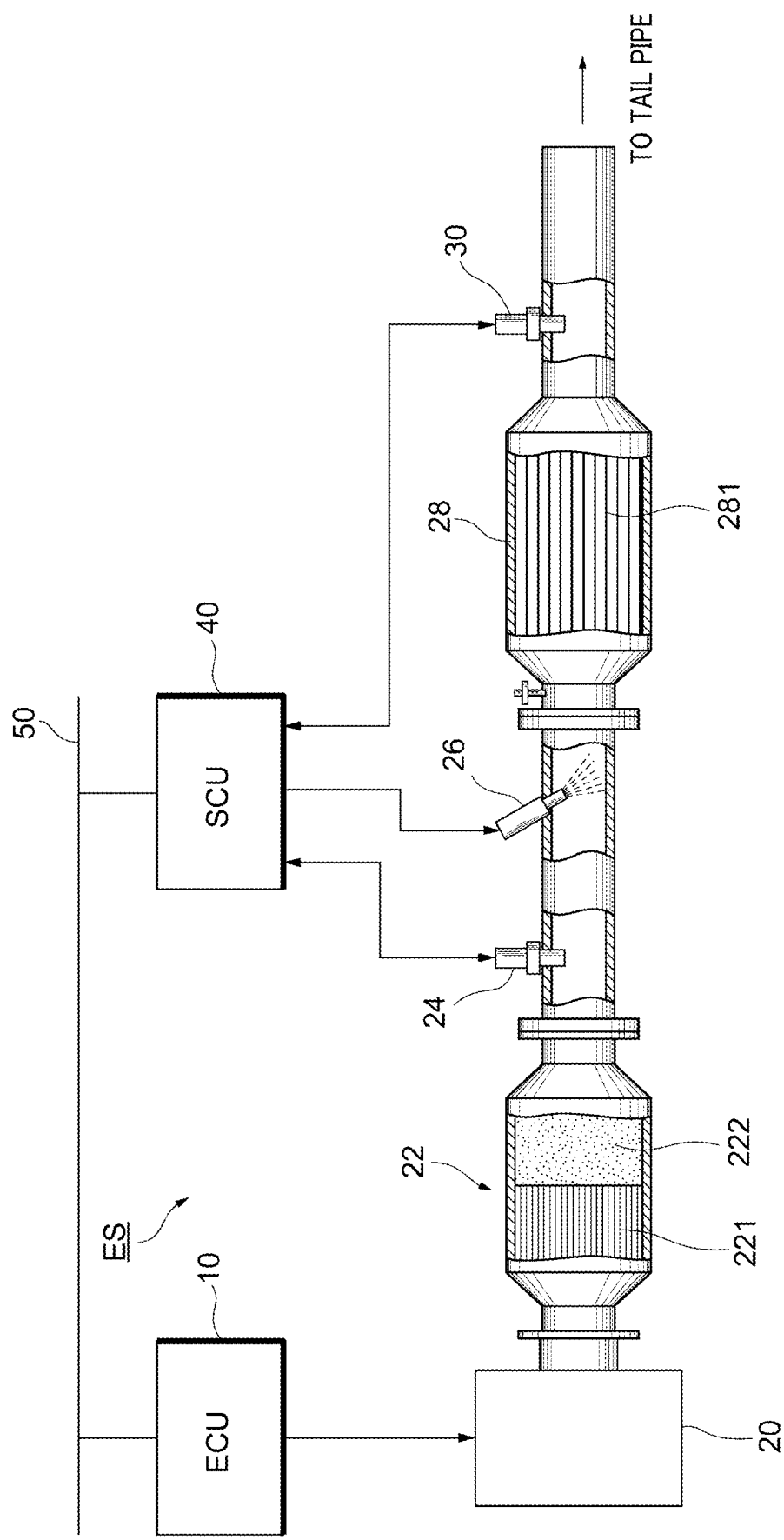
FIG. 1 is a diagram schematically illustrating an engine exhaust system.

An exhaust gas sensor for detecting components contained in an exhaust gas discharged from an internal combustion engine is configured to be converted into an active state when a predetermined condition is satisfied. Then, the exhaust gas sensor in the active state is capable of outputting detection data whose margin of error is within a predetermined range.

JP 2009-257889A discloses such an exhaust gas sensor capable of determining whether the exhaust gas sensor is in an active state.

JP 2009-257889A discloses a technology that determines whether the exhaust gas sensor has been activated based on a parameter indicating an element temperature of at least one cell constituting the exhaust gas sensor.

However, because the technology cannot uniquely identify the state of the exhaust gas sensor only from the temperature condition, although the technology identifies the exhaust gas sensor being in an active state, some gas components, which impair the correctness of detection data obtained by the exhaust gas sensor, may remain in the exhaust gas sensor.

The present disclosure seeks to provide control apparatuses for an exhaust gas sensor, each of which is capable of determining whether the exhaust gas sensor is in an active state in accordance with both a temperature condition of the exhaust gas sensor and the state of the exhaust gas sensor.

According to an aspect of the present disclosure, there is a control apparatus for an exhaust gas sensor. The control apparatus includes a temperature rise determination unit configured to acquire at least one of 1. A first parameter indicating a temperature of a first cell for removing oxygen from an exhaust gas discharged from an internal combustion engine 2. A second parameter indicating a temperature of a second cell for detecting a measurement target component contained in a measurement target gas generated by removing the oxygen from the exhaust gas by an operation of the first cell The temperature rise determination unit is configured to determine whether a temperature rise condition of at least one of the first cell and the second cell is satisfied in accordance with whether the at least one of the first parameter and the second parameter has exceeded a corresponding at least one temperature threshold.

The control apparatus includes an activation determination unit configured to

1. Determine, based on whether a time condition corresponding to the temperature threshold is satisfied, whether the exhaust gas sensor is in an active state in which the exhaust gas sensor is capable of performing a measurement operation with at least a predetermined accuracy 2. Determine that the exhaust gas sensor is in the active state upon, after the temperature rise condition is determined to be satisfied, the time condition corresponding to the temperature threshold being satisfied Establishment of the temperature rise condition enables the first cell or the second cell, which constitutes the exhaust gas sensor, to be determined to satisfy a necessary condition for being in the active state.

In addition to the temperature rise condition, determination of whether the time condition is established enables whether a decrease in concentration of a disincentive gas or impairing gas, which becomes an obstructive factor to the aim of ensuring the measurement accuracy in the exhaust gas sensor, to be determined. This therefore results in a more accurate activation determination.

The satisfaction of the time condition is determined in accordance with the temperature threshold for determining whether the temperature rise condition for the first cell or the second cell is satisfied. This makes it possible to, even if a setting value for the temperature threshold is determined to a relatively low value or a relatively high value, determine a decrease in the concentration of the disincentive gas based on the setting value.

Embodiments

The following describes an exemplary embodiment of the present disclosure with reference to the accompanying drawings. For ease of understanding the description, like reference signs are used for like components throughout the drawings wherever possible, and redundant descriptions thereof are omitted.

FIG. 1 illustrates an engine exhaust system ES to which an engine control unit (ECU) 10 and a sensor control unit (SCU) 40 are connected. The ECU 10 is operative to control a diesel engine 20 and the engine exhaust system ES connected to the diesel engine 20.

Specifically, the ECU 10 has a function of controlling the behavior of the diesel engine 20, and a function of adjusting the degree of opening of a fuel injection valve of the diesel engine 20 based on the position of an accelerator pedal and the rotational speed of the diesel engine 20.

The engine exhaust system ES includes a diesel oxidation catalytic converter 22 and a selective catalytic reduction (SCR) converter 28 in this order from the diesel engine 20. The diesel oxidation catalytic converter 22 includes a diesel oxidation catalyst (DOC) 221 and a diesel particulate filter (DPF) 222.

The diesel oxidation catalytic converter 22 purifies an exhaust gas by oxidizing or reducing harmful substances contained in the exhaust gas. In particular, the diesel oxidation catalytic converter 22 captures particulate matters (PM) composed in particular of carbon and/or other materials.

The diesel oxidation catalyst 221 is composed principally of a ceramic carrier, a mixture of aluminum oxide, cerium dioxide, and zirconium dioxide, and a noble metal catalyst such as platinum, palladium, and/or rhodium. The diesel oxidation catalyst 221 purifies exhaust gas by catalytically oxidizing hydrocarbon, carbon monoxide, and nitrogen oxides (NOx) contained in the exhaust gas. The diesel oxidation catalyst 221 generates heat during the catalytic reaction thereof, increasing the temperature of the exhaust gas.

The diesel particulate filter 222 has a honeycomb structure comprised of a porous ceramic and a platinum catalyst such as platinum or palladium supported on the porous ceramic. The diesel particulate filter 222 allows particulate matters contained in the exhaust gas to accumulate on partition walls of the honeycomb structure. This enables the accumulated particulate matters to be oxidized so as to be burnt out. That is, the accumulated particulate matters are burnt out based on, for example, an increase in temperature of the diesel oxidation catalyst 221 and/or a decrease in temperature of the accumulated particulate matters due to an additive agent.

As an aftertreatment device for the diesel oxidation catalytic converter 22, the SCR catalytic converter 28 reduces NOx to nitrogen and water. The SCR catalytic converter 28 includes an SCR 281 which is a catalyst for selectively reducing NOx. One example of the SCR 281 may include a substrate, such as zeolite or alumina, and a precious metal such as Pt supported on the surface of the substrate. The SCR 281 reduces NOx to thereby purify the exhaust gas, when 1. The SCR 281 has a temperature sufficient to allow the SCR 281 to be active
2. Urea has been added to the exhaust gas Specifically, a urea addition injector 26 is provided upstream of the SCR converter 28, which aims to add urea to the exhaust gas.

In the present embodiment, a NOx sensor 24 is provided between the diesel oxidation catalytic converter 22 and the urea addition injector 26, and a NOx sensor 30 is provided downstream of the SCR catalytic converter 28.

The amount of urea added to the SCR catalytic converter 28 from the urea addition injector 26 is determined based on both the concentration of NOx measured by the NOx sensor 24 and the concentration of NOx measured by the NOx sensor 30.

More specifically, the NOx sensor 24 measures the concentration of NOx in the exhaust gas that has not passed through the SCR catalytic converter 28, and the additive amount of urea is determined based on the measured concentration of NOx.

In addition, the NOx sensor 30 measures the concentration of NOx in the exhaust gas that has passed through the SCR catalytic converter 28. This enables the additive amount of urea to be corrected to cause the measured NOx concentration fed back from the NOx sensor 30 to be minimized as low as possible. The amount of urea determined set forth above is configured to be added to the SCR 281 from the urea addition injector 26, thereby allowing the SCR 281 to appropriately reduce NOx in the exhaust gas. Having passed through the NOx sensor 24 and the NOx sensor 30, hydrocarbon, carbon monoxide, and a nitrogen oxide are discharged to the outside through a tail pipe (not shown) located at the end of the engine exhaust system ES.

The SCU 40 measures output currents from the NOx sensor 24 and the NOx sensor 30. The SCU 40 measures the amount of gas and performs an abnormal detection task for each of the sensors 24 and 30, and transmits necessary data to the ECU 10. The ECU 10 and SCU 40 are connected to a controller area network (CAN) bus 50, and communicate information to each other via the CAN bus 50.

The ECU 10 includes a processor such as a CPU, a RAM, a ROM, input/output ports, and a storage. The following description of the present embodiment focuses on a function of the SCU 40 to detect abnormality in an electrical system connected to the NOx sensor 24 and the NOx sensor 30. Since the NOx sensor 24 and the NOx sensor 30 have the same configuration, the configuration of the NOx sensor 24 will now be described.

Figure 2:
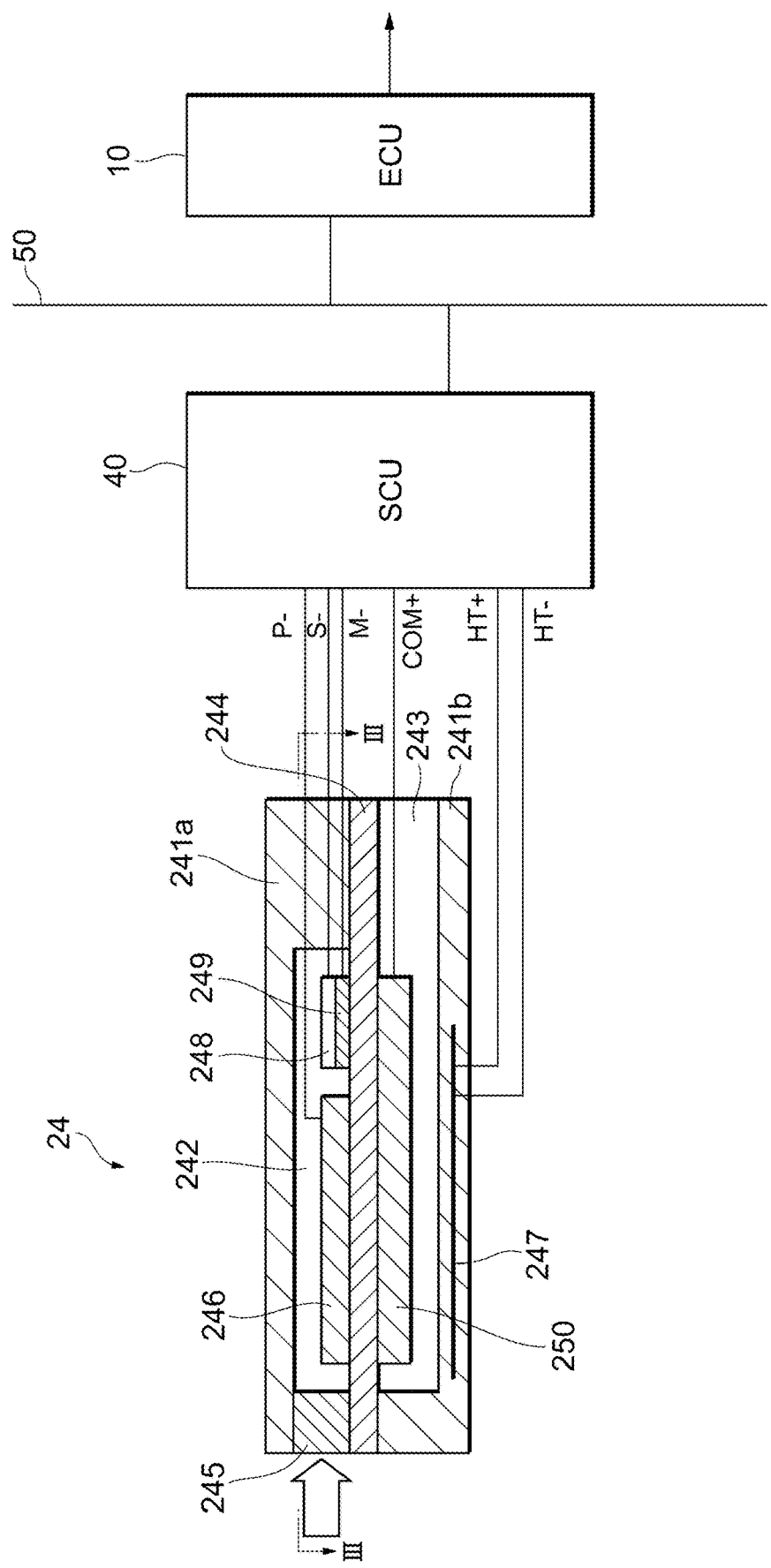
FIG. 2 is a diagram schematically illustrating the structure of a NOx sensor shown in FIG. 1.
Figure 3:
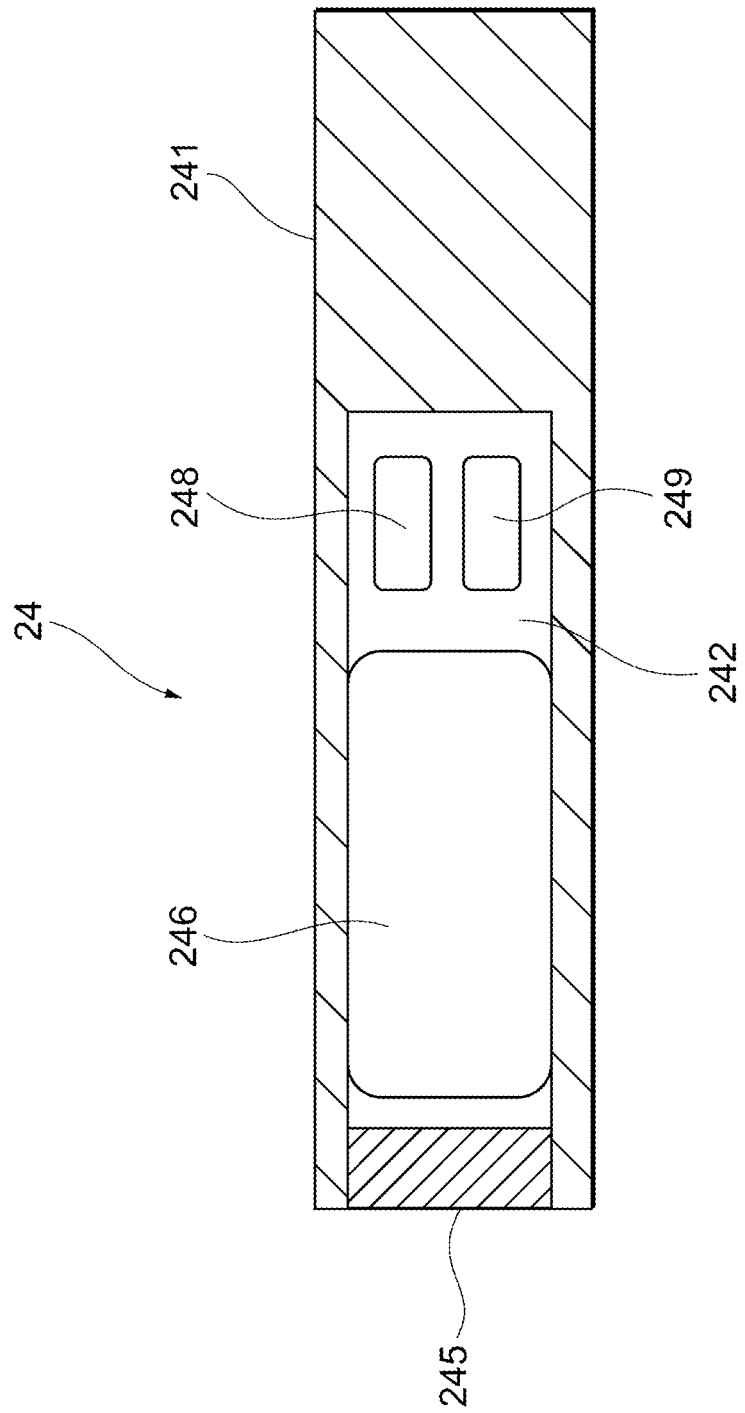
FIG. 3 is a cross-sectional view of the NOx sensor, taken along the line III-III of FIG. 2.

As illustrated in FIG. 2 and FIG. 3, the NOx sensor 24 includes a first body 241a, a second body 241b, a solid electrolyte 244, a diffusion resistor 245, a pump electrode 246, a heater 247, a sensor electrode 248, a monitor electrode 249, and a common electrode 250.

The solid electrolyte 244 is a plate-like member, and is composed of an oxide ion conductive solid electrolyte material such as zirconium oxide. The first body 241a and the second body 241b are each composed of an insulator that contains alumina as a major constituent, and are disposed with the solid electrolyte 244 therebetween.

The first body 241a has a chamber formed therein as a recess with respect to the solid electrolyte 244; the chamber serves as a measurement chamber 242. The measurement chamber 242 has one opening side in which the diffusion resistor 245 is disposed.

The diffusion resistor 245 is formed of a ceramic material such as porous alumina. The diffusion resistor 245 functions to regulate the flow rate of the exhaust gas drawn into the measurement chamber 242.

The second body 241b has a chamber formed therein as a recess with respect to the solid electrolyte 244; the chamber serves as an atmospheric chamber 243. The atmospheric chamber 243 has one opening side. This enables a gas drawn into the atmospheric chamber 243 via the solid electrolyte 244 to be discharged into the atmosphere.

The solid electrolyte 244 has opposing first and second surfaces. The first surface faces the measurement chamber 242, and the second surface faces the atmospheric chamber 243. The pump electrode 246 is disposed on the first surface of the solid electrolyte 244 to be adjacent to the diffusion resistor 245. The pump electrode 246 serves as a negative electrode. The pump electrode 246 is composed of a platinum-gold (Pt—Au) alloy.

The common electrode 250 is disposed on the second surface of the solid electrolyte 244 and positioned to face the pump electrode 246; the common electrode 250 serves as a positive electrode and is composed principally of platinum.

Applying a voltage between the pump electrode 46 and the common electrode 250 enables oxygen in the exhaust gas within the measurement chamber 242 to come into contact with the negative pump electrode 246, causing oxide ions to be generated.

These oxide ions flow through the solid electrolyte 244 toward the positive common electrode 250, releasing electrons to form oxygen at the common electrode 250. The generated oxygen is discharged from the atmospheric chamber 243 to the atmosphere. Thus, the pump electrode 246, the common electrode 250, and the solid electrolyte 244 between these two electrodes 246 and 250 provide a pump cell that functions to discharge oxide ions from the measurement chamber 242 to the atmospheric chamber 243.

The larger a voltage applied between the pump electrode 246 and the common electrode 250, the larger the amount of oxygen discharged through the pump cell from the exhaust gas to the atmosphere via the atmospheric air chamber 243. Conversely, the smaller a voltage applied between the pump electrode 246 and the common electrode 250, the smaller the amount of oxygen discharged through the pump cell from the exhaust gas to the atmosphere via the atmospheric chamber 243. Therefore, increasing or decreasing a voltage applied between the pump electrode 246 and the common electrode 250 enables an increase or decrease of the amount of oxygen remaining in the exhaust gas flowing to the sensor electrode 248 and the monitor electrode 249.

The monitor electrode 249 serving as a negative electrode is disposed on the first surface of the solid electrolyte 244 facing the measurement chamber 242. That is, the monitor electrode 249 is located on the opposite side of the pump electrode 246 from the diffusion resistor 245. The opposite side of the pump electrode 246 from the diffusion resistor 245 corresponds to the side closer to the rear side than the pump electrode 246 is. The common electrode 250 is disposed as the positive electrode for the monitor electrode 249 on the second surface of the solid electrolyte 244 facing the atmospheric chamber 243; a part of the common electrode 250 is positioned to face the monitor electrode 249. The monitor electrode 249, the common electrode 250, and the solid electrolyte 244 interposed between these two electrodes 249 and 250 provide a monitor cell that functions to measure the centration of oxygen.

The monitor cell measures the concentration of remaining oxygen in the exhaust gas from which oxygen has been discharged by the pump cell.

Applying a voltage between the monitor electrode 249 and the common electrode 250 enables remaining oxygen in the exhaust gas from which oxygen has been discharged by the pump cell to come into contact with the negative monitor electrode 249, causing oxide ions to be generated.

These oxide ions flow through the solid electrolyte 244 toward the positive common electrode 250, releasing electrons to become oxygen at the common electrode 250. The generated oxygen is discharged from the atmospheric chamber 243 to the atmosphere. The released electrons are detected as a monitor cell current Im by the monitor cell detection unit 404, and the concentration of remaining oxygen in the exhaust gas is calculated based on this monitor cell current Im.

The sensor electrode 248 serving as a negative electrode is disposed on the first surface of the solid electrolyte 244 facing the measurement chamber 242. That is, the sensor electrode 248 is located on the opposite side of the pump electrode 246 from the diffusion resistor 245. The common electrode 250 is disposed as the positive electrode for the sensor electrode 248 on the second surface of the solid electrolyte 244 facing the atmospheric chamber 243; a part of the common electrode 250 is positioned to face the sensor electrode 248. The sensor electrode 248, the common electrode 250, and the solid electrolyte 244 interposed these two electrodes 248 and 250 provide a sensor cell that calculates the concentration of NOx and residual oxygen in the exhaust gas.

The sensor electrode 248 is composed of a platinum-rhodium (Pt—Rh) alloy, and is highly effective in reducing NOx. NOx, which comes in contact with the sensor electrode 248, is reduced to $N_2$ and $O_2$.

Applying a voltage between the sensor electrode 248 and the common electrode 250 enables the $O_2$ to receive or accept electrons from the negative sensor electrode 248, causing oxide ions to be generated.

These oxide ions flow through the solid electrolyte 244 toward the positive common electrode 250, releasing electrons at the common electrode 250 to become oxygen, and the oxygen is discharged from the atmospheric chamber 243 to the atmosphere.

The amount of electrons released at the common electrode 250 is measured as a sensor cell current Is by the sensor cell detection unit 403, and the concentration of NOx and remaining oxygen in the exhaust gas is calculated based on this sensor cell current Is.

It is preferred to correct the effects of the pump cell in calculating the concentration of NOx, because the absolute volume of gas flowing into the measurement chamber 242 depends on the quantity of oxygen discharged by the pump cell.

The exhaust gas sensor may be configured to function as an air/fuel (A/F) ratio sensor, because the pump cell is capable of measuring an output signal indicative of the concentration of oxygen in the exhaust gas. The A/F ratio is preferably calculated based on a pump cell current Ip that flows between the pump electrode 246 and the common electrode 250. These gas-concentration measurements may be performed every cycle of 5 ms; this cycle can be suitable for the case of the NOx sensor 24 being used in vehicles.

The solid electrolyte 244 is required to be heated by the heater 247 to a predetermined temperature, because the gas-concentration measurements use the flow of oxide ions through the solid electrolyte 244. Since the NOx sensor 24 is not provided with a sensor that directly measures the temperature of the solid electrolyte 244, the temperature of the NOx sensor 24 is calculated based on at least one output current that flows through a corresponding at least one of the negative electrodes upon application of a predetermined voltage between the corresponding at least one of the negative electrodes and the positive common electrode 250. This is because the temperature of the solid electrolyte 244 correlates with its resistance.

Because the solid electrolyte 244 may have a capacitance component, it is preferred to remove the effects of the capacitance component of the solid electrolyte 244 in voltage application across the solid electrolyte 244. For this reason, it is preferable to use, as the application voltage across the solid electrolyte 244, a sweep voltage with a predetermined frequency, which is cyclically changing in a positive side and a negative side. Applying the sweep voltage across the solid electrolyte 244 enables a charge stored in the capacitor component based on a positive half cycle of the sweep voltage to be released based on a negative half cycle of the sweep voltage.

Applying the sweep voltage across the solid electrolyte 244 may cause an extra current caused by the sweep-voltage application to be superimposed on each output current indicative of the concentration of the corresponding gas; therefore, it is preferred not to measure the concentration of each gas during application of the sweep voltage or a predetermined period.

Applying the sweep voltage to the positive common electrode 250 enables, through each of the pump electrode 246, the sensor electrode 248, and monitor electrode 249, the corresponding output current. For this reason, it is possible to determine the temperature of the solid electrolyte 244 based on the output current through any one of the pump electrode 246, sensor electrode 248, and the monitor electrode 249.

It is preferred that the output current through each of, for example, the sensor electrode 248 and the monitor electrode 248 based on the sweep voltage is set to be higher than that therethrough during measurement of the corresponding gas concentration. It is also preferred to determine the temperature of the solid electrolyte 244 based on the output current through the pump electrode 246.

In order to prevent the solid electrolyte 244 from being damaged, the SCU 40, when activated, starts to perform a minute-current energization mode for the heater 247. The weak-current energization mode prevents the solid electrolyte 244 from being damaged due to 1. A sudden change in pressure inside the solid electrolyte 244 and/or
2. The solid electrolyte 244 being subjected to condensed water in a vehicular exhaust pipe After the start of the minute-current energization mode, in response to an energization request from the ECU 10, the SCU 40 causes the heater 247 to operate with a high duty cycle to thereby heat the solid electrolyte 244 up to a predetermined early-activation temperature at which the NOx sensor 24 is capable of measuring the concentration of each of the gases. The SCU 40 preferably has a function of interrupting energization of the heater 247 in response to the occurrence of damage to the solid electrolyte 244 or the occurrence of a fault in the NOx sensor 24, such as a wire break or a short-circuit in the circuit of the NOx sensor 24. In order to prevent the level of activation of the solid electrolyte 244 from changing due to a supply voltage for the SCU 40, it is preferred that the duty cycle of the heater 247 is varied based on a value of the supply voltage recognized by the SCU 40.

After energization of the heater 247 to thereby raise the temperature of the NOx sensor 247 up to the temperature condition on which the pump cell and the sensor cell are activated, a voltage is applied to the pump cell for discharging the oxygen from the measurement chamber 242 to the atmosphere chamber 243.

At the starting of the diesel engine 20, the surface of the sensor electrode 248 may be oxidized, so that a current may flow through the sensor cell under the influence of the oxygen contained in the surface of the sensor electrode 248. This may make it difficult to detect the NOx concentration with high accuracy at the starting of the diesel engine 20.

Thus, it is desired to temporarily apply a voltage higher than a formal voltage to the pump cell to thereby decompose a moisture content, such as water vapor, contained in the exhaust gas in the measurement chamber. This decomposition of the moisture component generates hydrogen, and the generated hydrogen results in the oxygen contained in the surface of the sensor electrode 248 being forcibly reduced.

Hereinafter, such control of temporarily applying a voltage to the pump cell will be referred to as early activation control.

Figure 4:
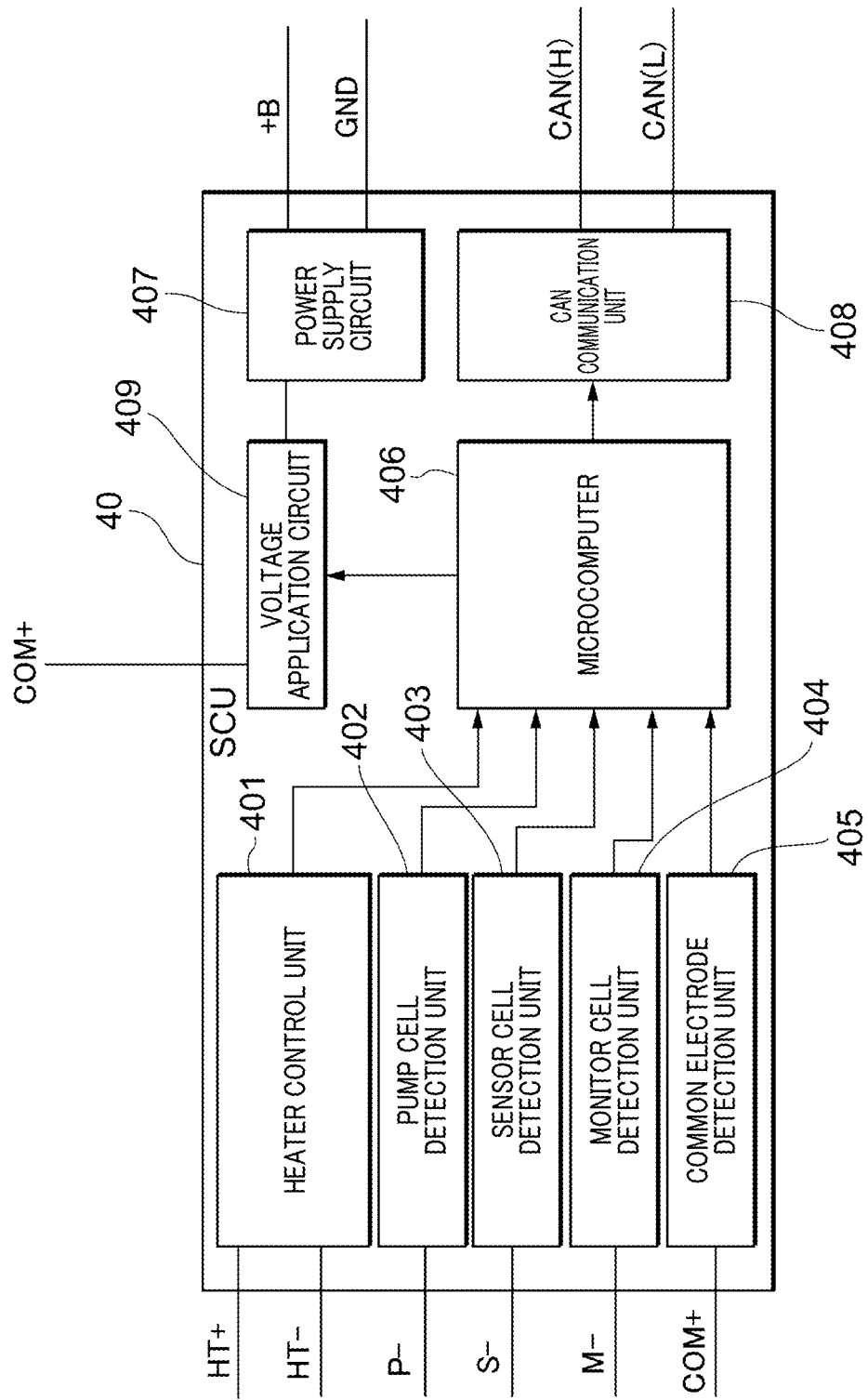
FIG. 4 is a block diagram illustrating the configuration of a sensor control unit (SCU) shown in FIG. 1.

The SCU 40 is partly or entirely constituted by an analog circuit or a digital processor including a memory. Whether the analog circuit or the digital processor, the SCU 40 includes functional components to perform a function of transmitting control signals based on received electronic signals. FIG. 4 is a block diagram illustrating the functional components of the SCU 40.

The functional components of the SCU 40 will now be described. The SCU 40 includes, as the functional components, a heater control unit 401, a pump cell detection unit 402, a sensor cell detection unit 403, a monitor cell detection unit 404, a common electrode detection unit 405, a microcomputer 406, a power supply circuit 407, a CAN communication unit 408, and a voltage application circuit 409.

The heater control unit 401 regulates a voltage applied to the heater 247 to control the amount of heat generated by the heater 247.

The pump cell detection unit 402 measures the pump cell current Ip that flows through the pump electrode 246. The pump cell detection unit 402 transmits, to the microcomputer 406, a signal indicating a measured value of the pump cell current Ip. The pump cell detection unit 402 is capable of measuring a pump cell voltage Vp across the pump cell. The pump cell detection unit 402 transmits, to the microcomputer 406, a signal indicating a measured value of the pump cell voltage Vp.

The sensor cell detection unit 403 measures the sensor cell current Is that flows through the sensor electrode 248. The sensor cell detection unit 403 transmits, to the microcomputer 406, a signal indicating a measured value of the sensor cell current Is.

The monitor cell detection unit 404 measures the monitor cell current Im that flows through the monitor electrode 249.

The monitor cell detection unit 404 transmits, to the microcomputer 406, a signal indicating a measured value of the monitor cell current Im.

The common electrode detection unit 405 measures a common electrode current Icom that flows through the common electrode 250. The common electrode detection unit 405 transmits, to the microcomputer 406, a signal indicating a measured value of the common electrode current Icom. The common electrode detection unit 405 is capable of measuring a common electrode voltage Vcom at the common electrode 250. The common electrode detection unit 405 transmits, to the microcomputer 406, a signal indicating a measured value of the common electrode voltage Vcom.

The microcomputer 406 serves as a controller in the SCU 40. The microcomputer 406 transmits, to the heater control unit 401, a control signal for controlling the temperature of the heater 247. The microcomputer 406 calculates the concentration of NOx in the exhaust gas based on the sensor cell current Is measured by the sensor cell detection unit 403 and the monitor cell current Im measured by the monitor cell detection unit 404.

That is, the microcomputer 406 subtracts the monitor cell current Im, which is output from the monitor electrode 249, from the sensor cell current Is, which is output from the sensor electrode 248, to thereby exclude, from the sensor cell current Is, a current value based on the concentration of the remaining oxygen outputted from the sensor cell. This calculates the concentration of NOx in the exhaust gas. The microcomputer 406 transmits, to the CAN communication unit 408, a signal indicating the calculated concentration of NOx.

The power supply circuit 407 serves as a power source for the components of the SCU 40. The CAN communication unit 408 transmits, to the CAN bus 50, signals transmitted from the microcomputer 406, and transmits, to the microcomputer 406, signals received from the CAN bus 50.

The voltage application circuit 409 applies a voltage to, for example, each of the common electrode 250 and the pump electrode 246. The voltage application circuit 409 applies the sweep voltage whose level continuously varies to the common electrode 250. The voltage application circuit 409 is capable of applying a variable voltage to the pump electrode 246. The voltage application circuit 409 may be a composite circuit that has other measurement functions (e.g., current measurement or voltage measurement).

Figure 5:
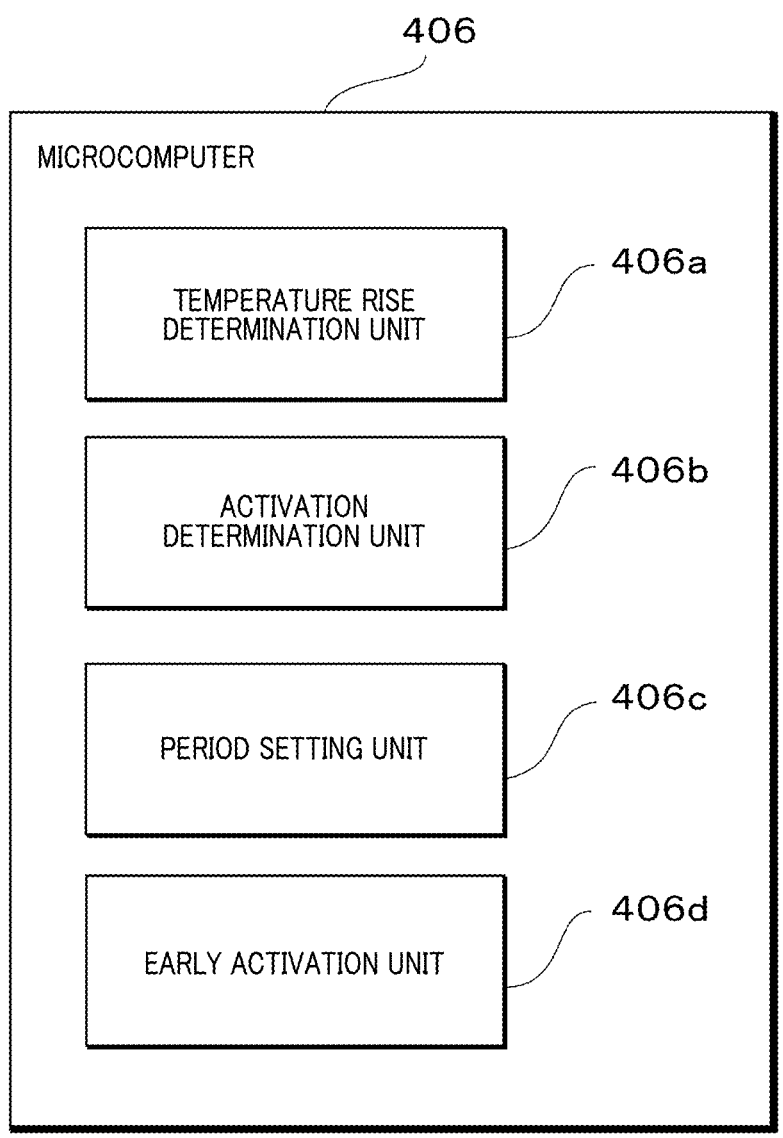
FIG. 5 is a block diagram illustrating functional components of a microcomputer shown in FIG. 4.

The following describes functional components of the microcomputer 406 with reference to FIG. 5. The functional components of the microcomputer 406 include a temperature rise determination unit 406a, an activation determination unit 406b, a period setting unit 406c, and an early activation unit 406d.

The voltage application unit 406a applies a normal voltage and a removal voltage higher than the normal voltage for removing oxygen, to the pump cell, which is a first cell for removing oxygen in the exhaust gas from the diesel engine 20.

Figure 6:
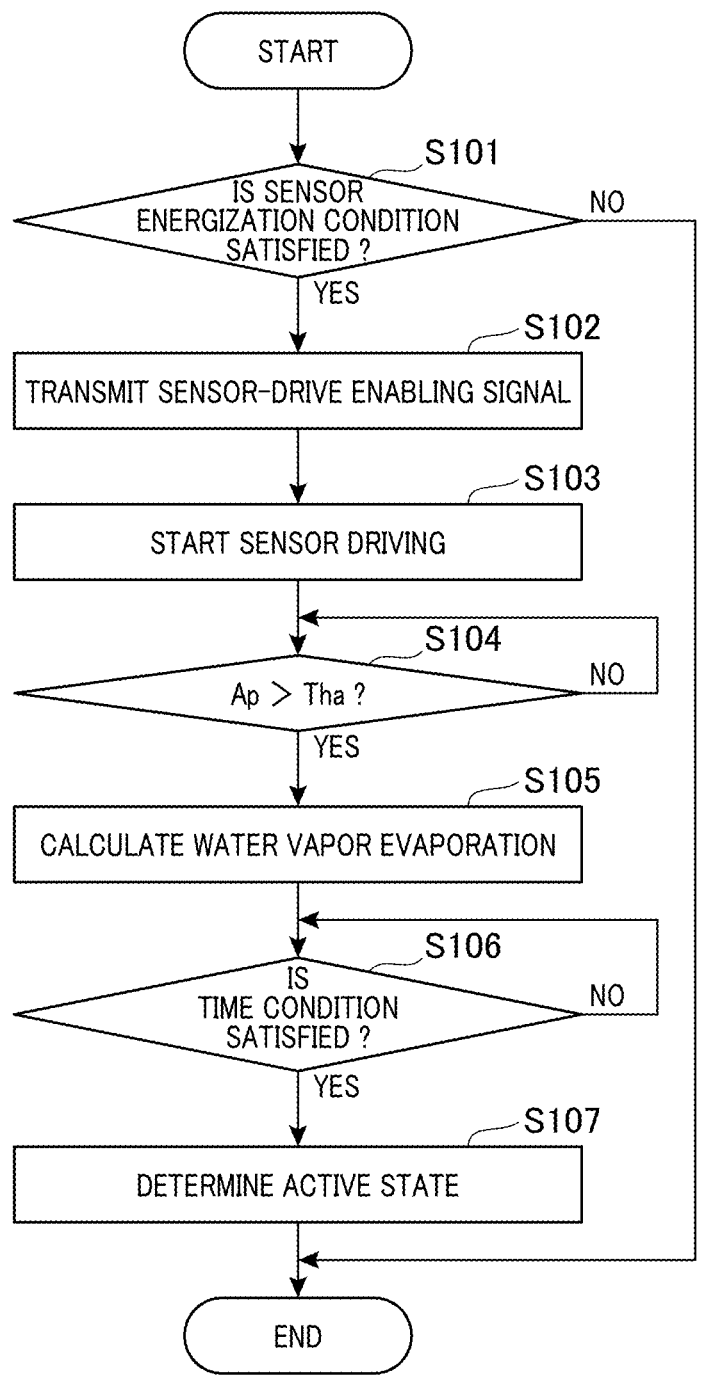
FIG. 6 is a flowchart illustrating a routine performed by an engine control unit (ECU) and the SCU shown in FIG. 1.

Next, the following describes a routine performed by the ECU 10 and the SCU 40 with reference to the flowchart of FIG. 6.

At step S101, the ECU 10 determines whether a sensor energization condition is satisfied. The sensor energization condition is satisfied if the condition of the NOx sensor 24, i.e. the exhaust gas sensor, satisfies predetermined one or more dry conditions. If the sensor energization condition is satisfied (YES at step S101), the routine proceeds to step S102. Otherwise, if the sensor energization condition is not satisfied (NO at step S101), the routine is terminated.

At step S102, the ECU 10 transmits a sensor-drive enabling signal indicative of a sensor-drive permission to the SCU 40. At step S103 following step S102, the SCU 40 energizes the NOx sensor 24 in response to the sensor-drive enabling signal to thereby start driving the NOx sensor 24.

At step S104 following step S103, the SCU 40 applies a predetermined voltage as a part of a predetermine alternating-current (AC) voltage to, for example, the pump cell of the NOx sensor 24 to thereby energize the NOx sensor 24, and measures a pump cell admittance Ap. At step S104, the SCU 40 determines whether the pump cell admittance Ap is greater than a predetermined hydrogen generation admittance Ah, thus determining whether a temperature rise condition is established.

If the pump cell admittance Ap is less than or equal to the hydrogen generation admittance Ah (NO at step S104), the determination at step S104 is repeatedly executed.

Otherwise, if the pump cell admittance Ap is greater than the hydrogen generation admittance Ah (YES at step S104), the routine proceeds to step S105.

At step S105, the SCU 40 calculates a water evaporation period based on a time interval defined from the start of driving the NOx sensor to the time at which the pump cell admittance Ap has exceeded a predetermined activation admittance threshold Tha.

At step S106 following step S105, the SCU 40 determines whether a predetermined evaporation time condition is satisfied.

Whether the evaporation time condition is satisfied represents whether a waiting time, which is required to eliminate the influence of water vapor and/or the influence of rich gas remaining in each of the sensor and monitor cells as the second cell, has elapsed since the establishment of the temperature rise condition.

Setting the activation admittance threshold Tha for satisfying the temperature rise condition is set to be low causes a time length required to eliminate the influence of water vapor and/or the influence of rich gas remaining in each of the sensor and monitor cells to become long, resulting in the waiting time for satisfying the evaporation time condition becoming long.

Otherwise, setting the activation admittance threshold Tha for satisfying the temperature rise condition is set to be high causes the time length required to eliminate the influence of water vapor and/or the influence of rich gas remaining in each of the sensor and monitor cells to become short, resulting in the waiting time for satisfying the evaporation time condition becoming short, especially becoming zero.

As an example, the SCU 40 sets the evaporation time condition is set in accordance with the operating condition of the NOx sensor 24 under which the period required for water vapor and/or rich gas remaining in each of the sensor and monitor cells to disappear becomes longest. In another example, the SCU 40 sets the evaporation time condition in accordance with an elapsed time that has elapsed from the start of driving the NOx sensor 24 at step S103 to the establishment of the temperature rise condition at step S104. In a further example, the SCU 40 sets the evaporation time condition such that, when a predetermined threshold time has elapsed since the start of driving the NOx sensor 24, the evaporation time condition is satisfied.

Figure 9:
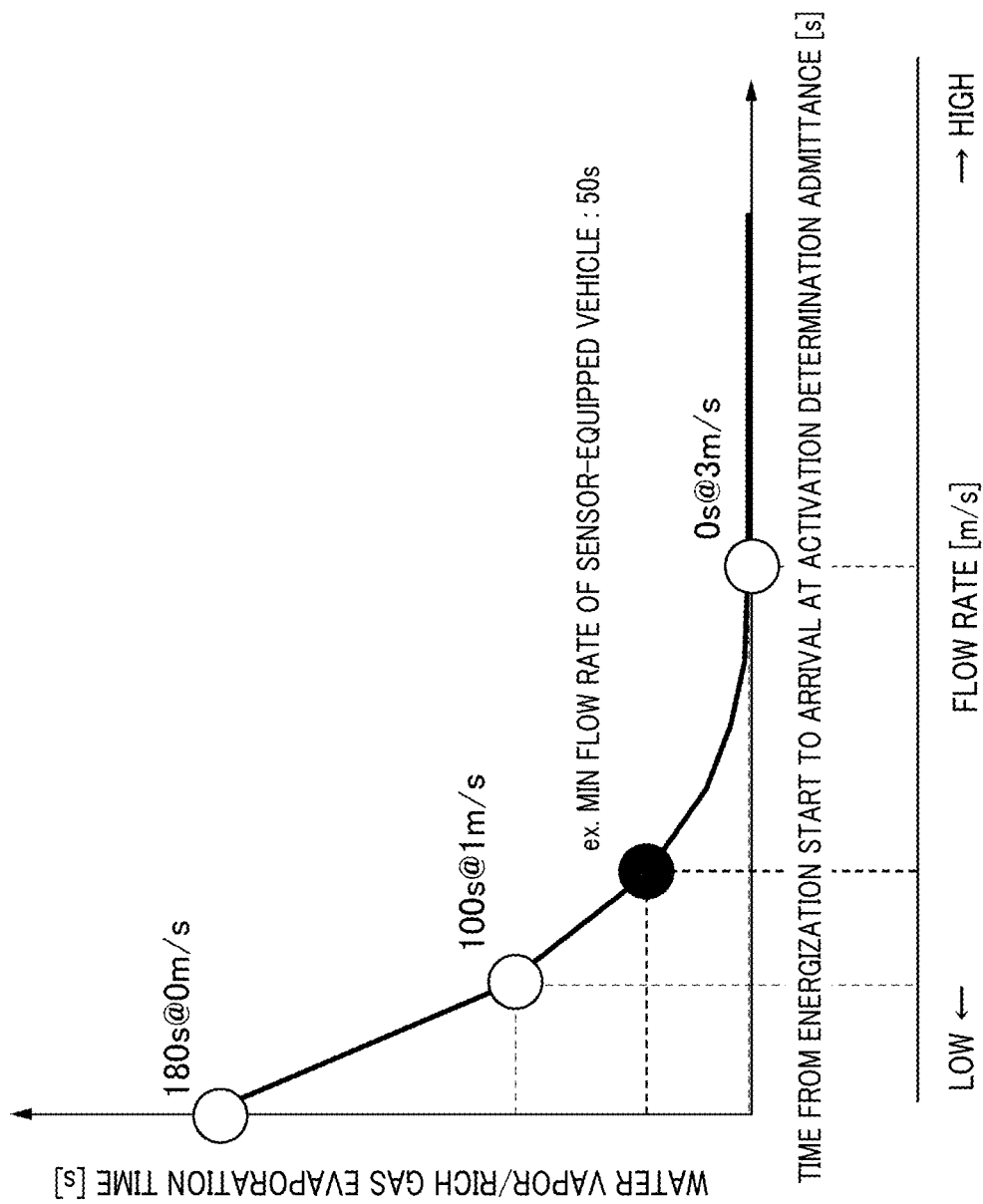
FIG. 9 is a graph used for describing the routine performed by the SCU of FIG. 1.

As illustrated in FIG. 9, when an elapsed time that has elapsed from the start of energization of the NOx sensor 24 for driving it to the arrival time at which the pump-cell admittance Ap has arrived at the activation admittance threshold Tha becomes short, an evaporation period of water vapor and/or rich gas becomes long.

In addition, when the flow rate of the exhaust gas in a predetermined position at which the NOx sensor 24 is arranged becomes low, the evaporation period of water vapor and/or rich gas becomes long.

Based on the items of information indicative of the correlation between the evaporation period and the elapsed time and the correlation between the evaporation period and the flow rate of the exhaust gas, the SCU 40 is capable of determining the threshold time. As another example, the SCU 40 is capable of setting an evaporation period corresponding to a predetermined minimum flow rate of the exhaust gas for the vehicle in which the NOx sensor 24 is installed as the threshold time.

Figure 10:
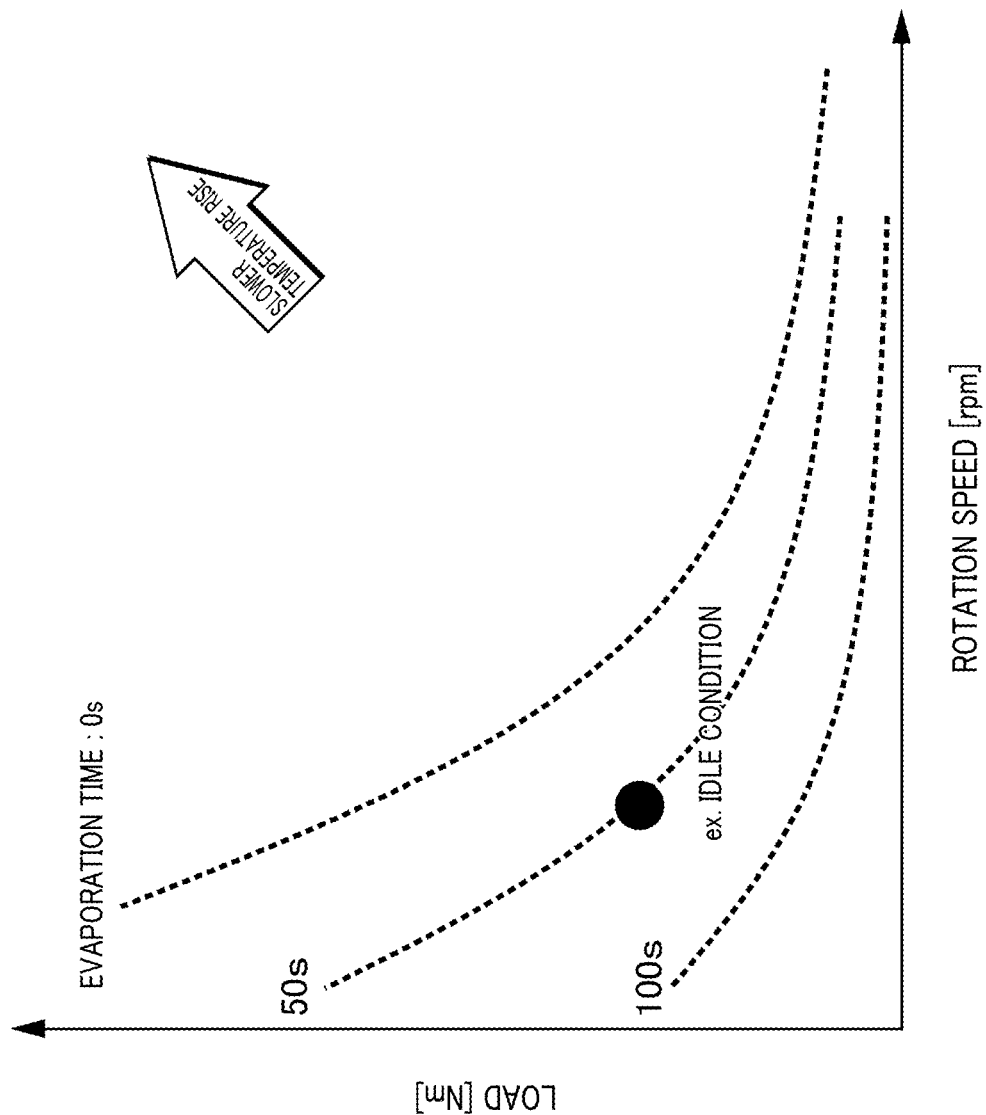
FIG. 10 is a graph used for describing the routine performed by the SCU of FIG. 1.

Based on a correlation between the rotational speed of the diesel engine 20 and at least one load on the diesel engine 20 as illustrated in FIG. 10, the SCU 40 can determine the evaporation period of water vapor and/or rich gas. For example, the SCU 40 can set the evaporation period to 50 seconds while the diesel engine 20 is operating in a predetermined idle reduction mode.

Upon determining that the evaporation time condition is not satisfied (NO at step S106), the SCU 40 repeats the determination at step S106.

Otherwise, upon determining that the evaporation time condition is satisfied (YES at step S106), the routine proceeds to step S107.

At step S107, the SCU 40 determines that the NOx sensor 24 is in the active state upon determining that water vapor and/or rich gas are sufficiently eliminated from the NOx sensor 24.

Figure 7:
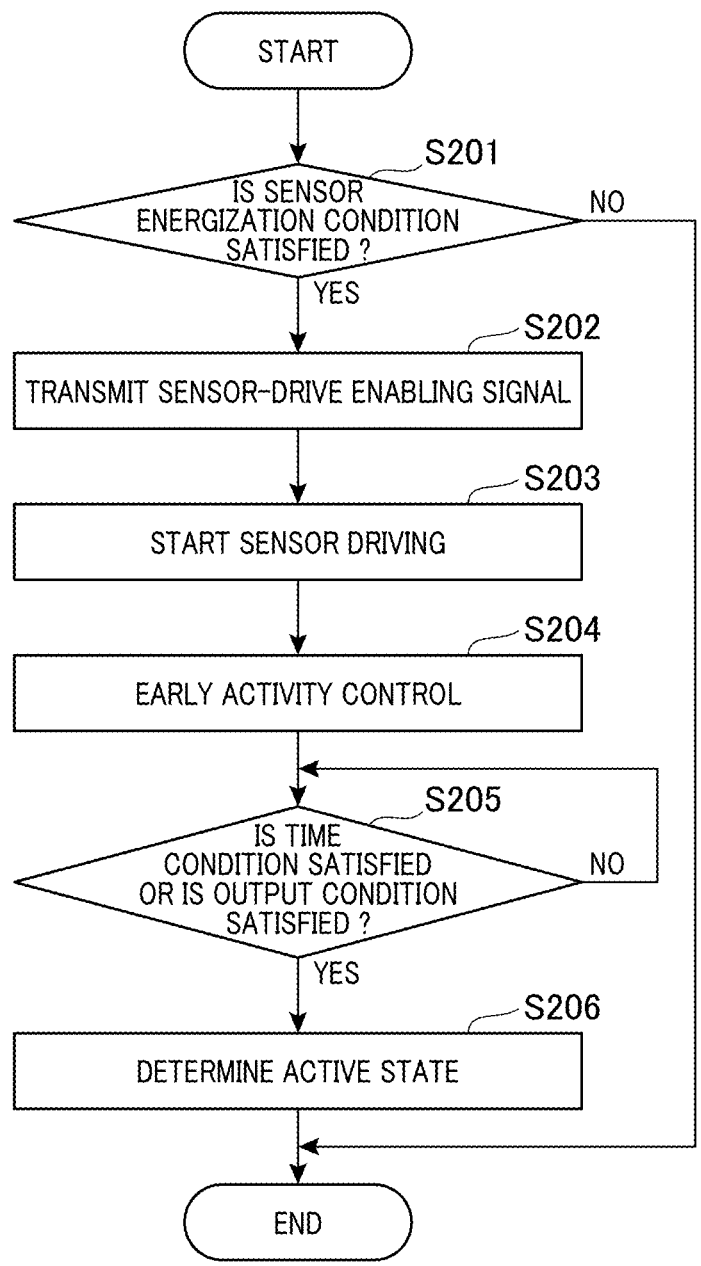
FIG. 7 is a flowchart illustrating the routine performed by the ECU and the SCU shown in FIG. 1.

Next, the following describes a routine performed by the ECU 10 and the SCU 40 upon executing the early activation control with reference to the flowchart of FIG. 7.

At step S201, the ECU 10 determines whether the sensor energization condition is satisfied. The sensor energization condition is satisfied if the condition of the NOx sensor 24, i.e. the exhaust gas sensor, satisfies predetermined one or more dry conditions. If the sensor energization condition is satisfied (YES at step S201), the routine proceeds to step S202. Otherwise, if the sensor energization condition is not satisfied (NO at step S201), the routine is terminated.

At step S202, the ECU 10 transmits the sensor-drive enabling signal indicative of the sensor-drive permission to the SCU 40. At step S203 following step S202, the SCU 40 energizes the NOx sensor 24 in response to the sensor-drive enabling signal to thereby start driving the NOx sensor 24.

At step S204 following step S203, the SCU 40 performs the early activation control. Specifically, the SCU 40 temporarily rises the applied voltage to the pump cell during a predetermined period to thereby perform the early activation control during the predetermined period.

At step S205, following step S204, the SCU 40 determines whether an activation-control time condition is satisfied. Instead of the activation-control time condition, the SCU 40 may determine whether an output condition is satisfied.

The activation-control time condition is for example satisfied when a predetermined hydrogen-disappearance time has elapsed since termination of the voltage application as the early activation control; the hydrogen-disappearance time is required for the influence of hydrogen generated based on the early activation control to disappear. The output condition is for example satisfied when the output of the monitor cell becomes a substantially positive value.

Figure 11:
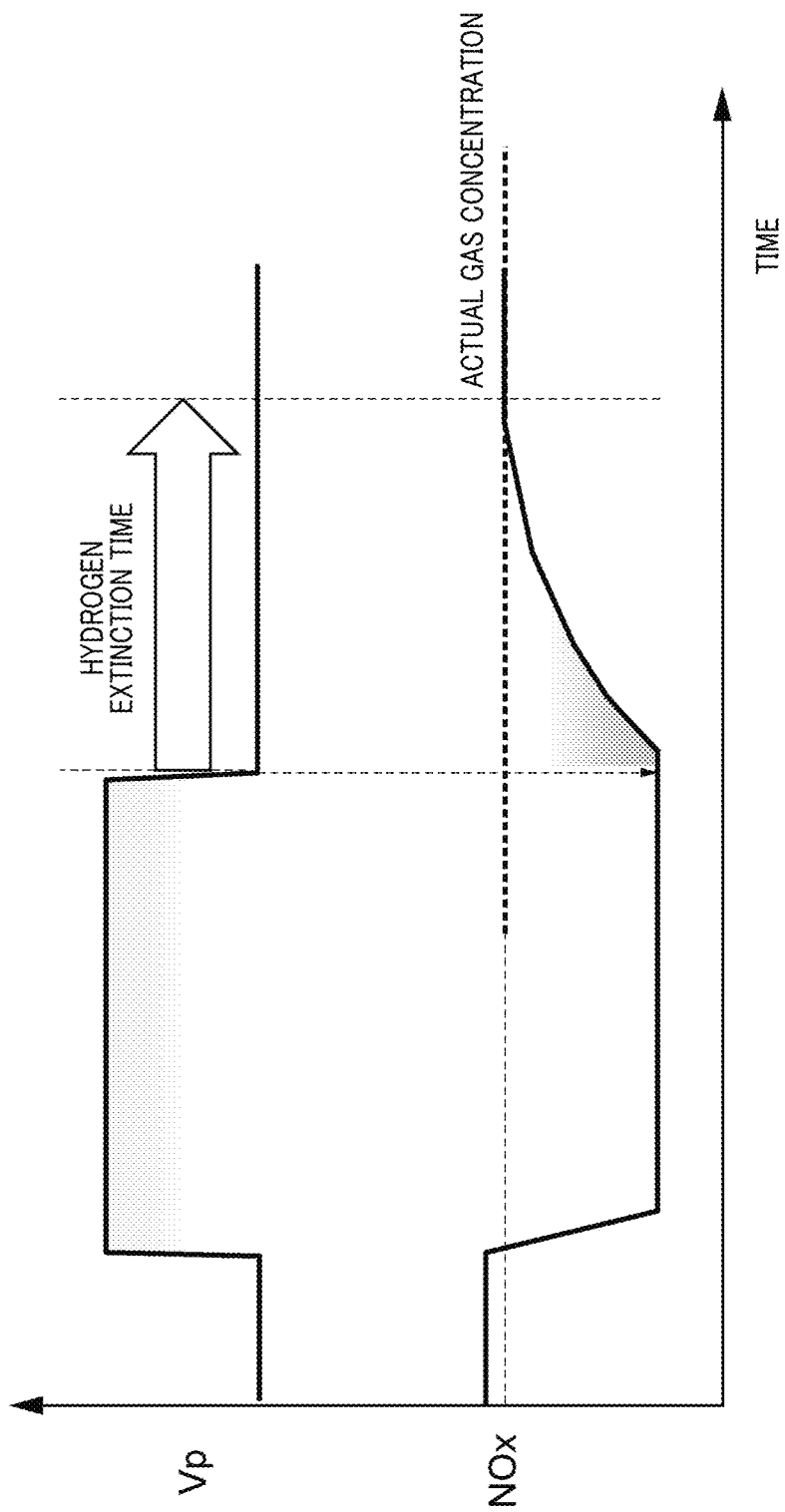
FIG. 11 is a graph used for describing the routine performed by the SCU of FIG. 1.

As illustrated in FIG. 11, even when the application of the temporarily increased voltage is terminated so that the early activation control is terminated, a detected concentration of NOx is deviated from an actual gas concentration due to hydrogen remaining in the exhaust gas.

From this viewpoint, the SCU 40 sets the hydrogen-disappearance time as illustrated in FIG. 11, and determines that the activation-control time condition is satisfied upon the hydrogen-disappearance time has elapsed since termination of the voltage application to the pump cell (see FIG. 11).

Figure 12:
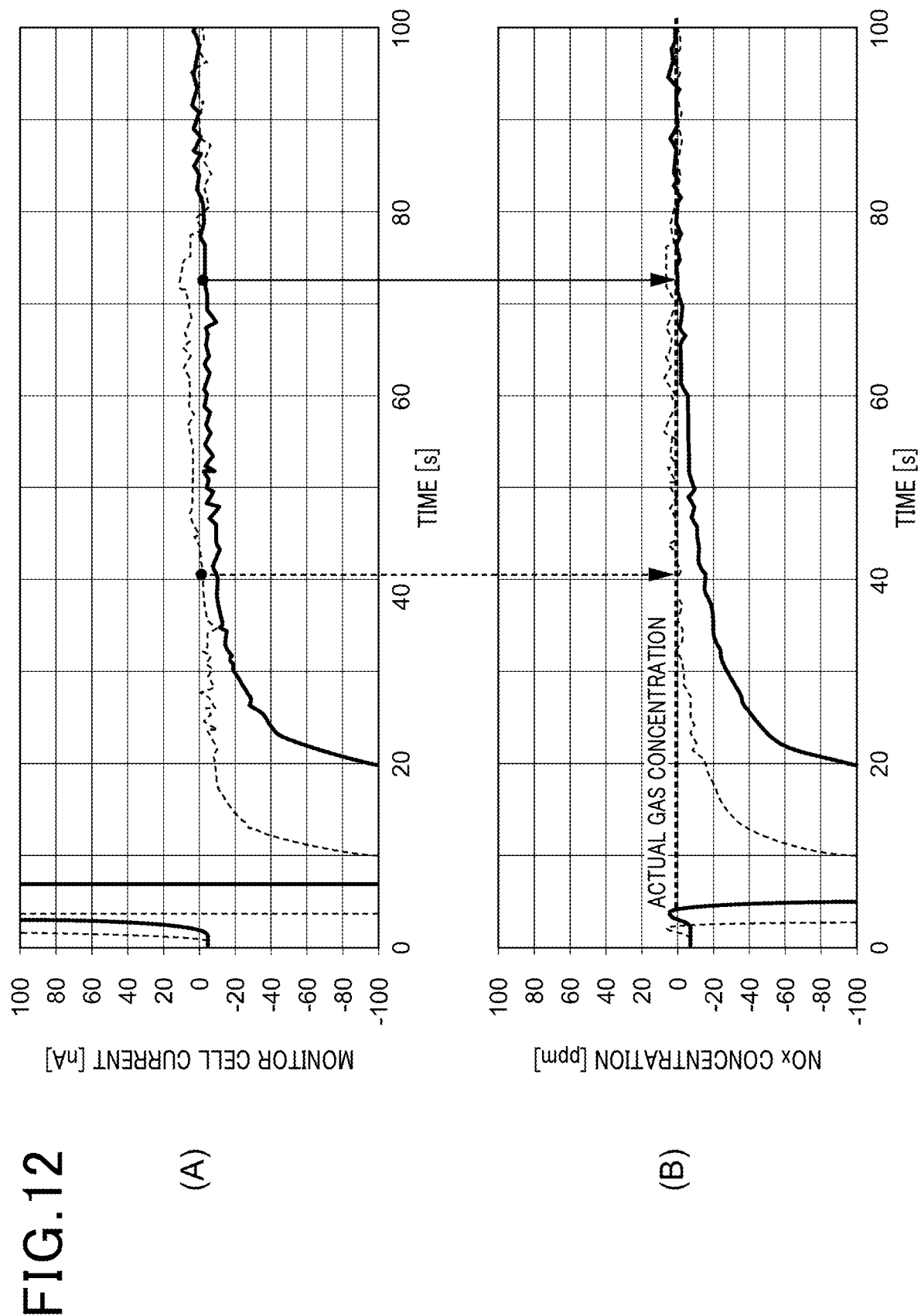
FIG. 12 is a graph used for describing the routine performed by the SCU of FIG. 1.

Reference character (A) of FIG. 12 illustrates how the monitor cell current through the monitor cell of a first NOx sensor whose hydrogen disappears slower than that of a second NOx sensor is changed over time (see solid line), and how the monitor cell current through the monitor cell of the second NOx sensor whose hydrogen disappears faster than that of the first NOx sensor is changed over time (see dashed line).

Similarly, reference character (B) of FIG. 12 illustrates how the detected concentration of NOx of the first NOx sensor is changed over time (see solid line), and how the detected concentration of NOx of the second NOx sensor is changed over time (see dashed line).

In each of the first and second NOx sensors, the detected NOx concentration becomes closer to the actual gas concentration around when a value of the monitor cell current has exceeded zero.

This makes it possible to determine that the influence of the residual hydrogen is eliminated on the condition that the output of the monitor cell becomes a substantially positive value.

Note that, since the monitor cell current may fluctuate, it is preferably determined that the influence of the residual hydrogen is eliminated not only when the monitor cell current becomes instantaneously positive but also 1. When the monitor cell current has been continuously positive for a predetermined period, or
2. When the monitor cell current becomes positive several times In consideration to a detection error in the monitor cell current detected by the SCU 40, it is possible to determine that the influence of the residual hydrogen is eliminated when the monitor cell current has exceeded a threshold, which is negatively offset slightly by, for example, several nano amperes relative to zero.

When the activation-control time condition or the output condition is not satisfied at step S205, the SCU 40 repeats the determination at step S205.

Otherwise, when the activation-control time condition or the output time condition is satisfied at step S106, the routine proceeds to step S206.

At step S206, the SCU 40 determines that the NOx sensor 24 is in the active state upon determining that hydrogen is sufficiently eliminated from the NOx sensor 24.

Figure 8:
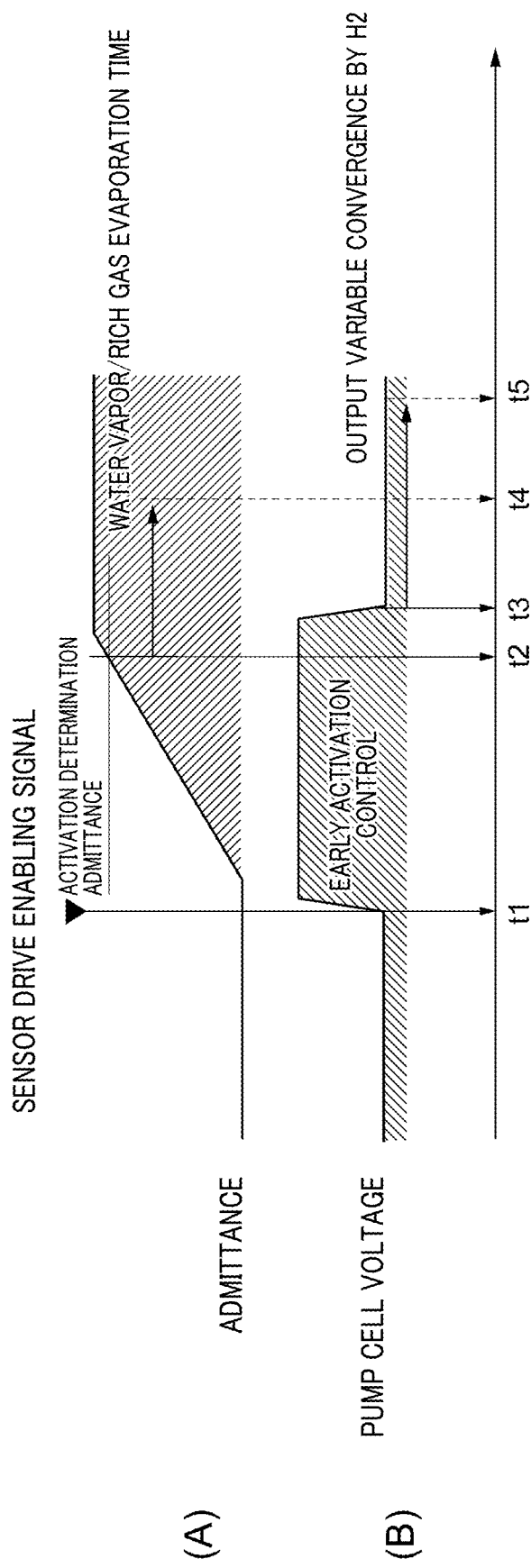
FIG. 8 is a graph used for describing the routine performed by the SCU of FIG. 1.

Reference character (A) of FIG. 8 illustrates the satisfaction of the temperature rise condition and the satisfaction of the evaporation time condition of water vapor/rich gas evaporation described above with reference to FIG. 6.

In addition, reference character (B) of FIG. 8 illustrates the satisfaction of the activation-control time condition or the output time condition for hydrogen disappearance described above with reference to FIG. 7; the activation-control time condition or the output time condition will be collectively referred to as a disappearance time condition.

Time t1 illustrated by reference character (A) of FIG. 8 represents the operation timing at step S102 illustrated in FIG. 6. Time t2 illustrated by reference character (A) of FIG. 8 represents the operation timing at step S104 illustrated in FIG. 6. Time t4 illustrated by reference character (A) of FIG. 8 represents the operation timing at step S106 illustrated in FIG. 6.

Time t1 illustrated by reference character (B) of FIG. 8 represents the operation timing at each of steps S203 and 204 illustrated in FIG. 7. Time t3 illustrated by reference character (B) of FIG. 8 represents the termination timing of the operation at step S204 illustrated in FIG. 7. Time t5 illustrated by reference character (B) of FIG. 8 represents the operation timing at step S205 illustrated in FIG. 7.

The graph illustrated by reference character (A) of FIG. 8 shows that, for a case of no execution of the early activation control, it is possible to determine that activation of the NOx sensor 24 is completed upon both the temperature rise condition and the time condition for evaporation of water vapor/rich gas being established, which are descried with reference to FIG. 6.

The graph illustrated by reference character (B) of FIG. 8 shows that, for a case of execution of the early activation control, it is possible to determine that activation of the NOx sensor 24 is completed upon 1. Both the temperature rise condition and the evaporation time condition for evaporation of water vapor/rich gas being established (see FIG. 6)
2. The disappearance time condition for disappearance of hydrogen (see FIG. 7) being established The SOC 40 is also capable of determining whether there is an abnormality or fault in the NOx sensor 24 in accordance with the temperature rise condition and/or the evaporation time condition.

Figure 13:
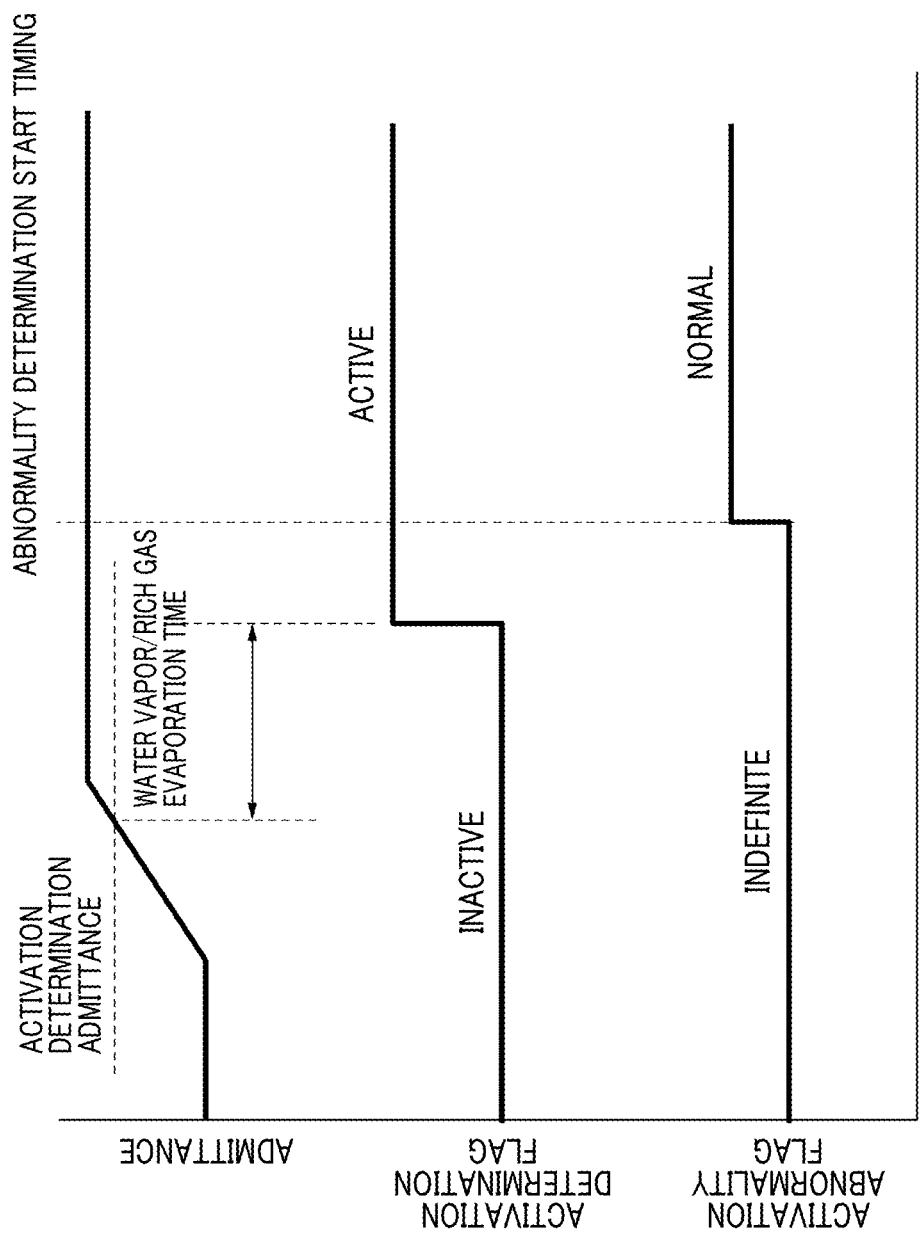
FIG. 13 is a graph used for describing the routine performed by the SCU of FIG. 1.

Specifically, if the NOx sensor 24 operates normally, as illustrated in FIG. 13, a predetermined diagnostic timing is programmed to occur after establishment of both the temperature rise condition and the evaporation time condition (see FIG. 13). This enables the SOC 40 to determine that there are no abnormalities in the NOx sensor 24, and to change an activation abnormality flag from an indefinite value to a normal value.

Figure 14:
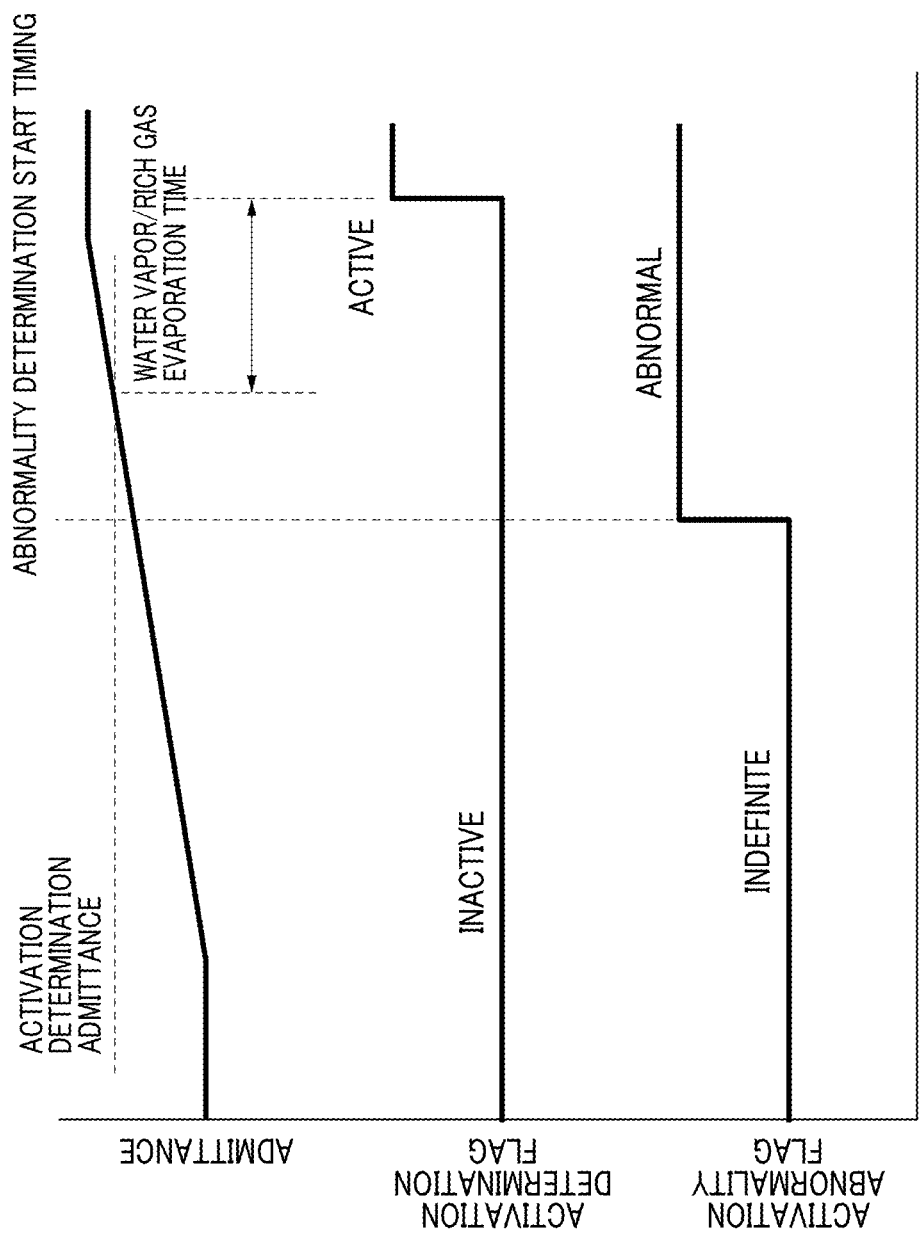
FIG. 14 is a graph used for describing the routine performed by the SCU of FIG. 1.

Otherwise, if there is an abnormality in the NOx sensor 24, as illustrated in FIG. 14, the predetermined diagnostic timing occurs neither establishment of the temperature rise condition nor establishment of the evaporation time condition (see FIG. 14). This enables the SOC 40 to change the activation abnormality flag from the indefinite value to an abnormal value.

The microcomputer 406 of the present embodiment, which serves as a control apparatus for the NOx sensor 24 as an exhaust gas sensor, includes the temperature rise determination unit 406a and the activation determination unit 406b.

The temperature rise determination unit 406a is configured to acquire

1. A first parameter indicating the temperature of the pump cell that serves as the first cell for removing oxygen from the exhaust gas discharged from the internal combustion engine 20
2. A second parameter indicating the temperature of each of the sensor cell and the monitor cell, which serves as the second cell for detecting a measurement target component contained in a measurement target gas generated by removing oxygen from the exhaust gas by the pump cell serving as the first cell The activation determination unit 406b is configured to determine whether the NOx gas sensor 24 is in the active state in which the NOx gas sensor 24 is capable of performing a measurement operation with at least a predetermined accuracy.

In addition, the temperature rise determination unit 406a is configured to determine whether at least one of the first and second parameters has exceeded a predetermined temperature threshold to thereby determine whether the temperature rise condition is satisfied.

The activation determination unit 406b is additionally configured to determine whether the evaporation time condition is satisfied after establishment of the temperature rise condition, and to determine that the NOx sensor 24 is in the active state upon determining that the evaporation time condition is satisfied.

Establishment of the temperature rise condition enables the first cell or the second cell, which constitutes the NOx sensor 24 serving as an exhaust gas sensor, to be determined to satisfy a necessary condition for being in the active state.

In addition to the temperature rise condition, determination of whether the evaporation time condition is established enables whether a decrease in concentration of a disincentive gas or impairing gas, which becomes an obstructive factor to the aim of ensuring the measurement accuracy in the NOx sensor 24, to be determined. This therefore results in a more accurate activation determination.

The satisfaction of the evaporation time condition is determined in accordance with the temperature threshold for determining whether the temperature rise condition for each of the first cell and the second cell is satisfied. This makes it possible to, even if a setting value for the temperature threshold is determined to a relatively low value or a relatively high value, determine a decrease in the concentration of the disincentive gas based on the setting value.

The present embodiment is configured such that the evaporation time condition is determined to cause, after the satisfaction of the temperature rise condition, a period required for eliminating the influence of water vapor and/or rich gas in the second cell to be ensured.

The evaporation time condition is set such that, after the satisfaction of the temperature rise condition, the time required for eliminating the influence of water vapor and/or rich gas in the second cell is ensured. This therefore reliably eliminates the influence of water vapor and/or rich gas as the impairing gas, making it possible to perform activation determination of the NOx sensor 24 more accurately.

At least one of the first parameter and the second parameter is the admittance or impedance of the first or second cell at the time of applying the AC voltage to the first or second cell. Using the admittance or impedance of the first or second cell at the time of applying the AC voltage to the first or second cell makes it possible to accurately perform the determination of whether the temperature of the first or second cell has risen.

The microcomputer 406 according to the resent embodiment includes the period setting unit 406c configured to set a predetermined period as the water evaporation period for determining whether the evaporation time condition is satisfied. The period setting unit 406c is specially configured to set the predetermined period based on the time interval defined from the start of energizing the first and second cells to the time at which the temperature rise condition is established.

Because the time interval from the start of energizing the first and second cells to the time at which the temperature rise condition is established varies depending on the reactive abilities of the first and second cells, setting the predetermined period based on the time interval enables the determination of whether the evaporation time condition is satisfied to be optimized.

The time setting unit 406c according to the present embodiment is configured to set the predetermined period for determining whether the evaporation time condition is satisfied, in accordance with an environmental condition in which the NOx sensor 24 is provided and/or operating conditions of the diesel engine 20.

The environment in which the exhaust gas sensor is provided and/or the operating conditions of the engine 20 have an impact on the decrease in the concentration of the impairing gas. Thus, setting the predetermined period based on the environmental and operating conditions makes it possible to set the evaporation time condition in accordance with the environmental and the operating conditions.

The microcomputer 406 according to the resent embodiment further includes the early activation unit 406d configured to execute early activation control to thereby temporarily increase the voltage to be applied to the first cell at the startup of the diesel engine 20.

Specifically, the early activation unit 406d is configured to determine whether an early-activation completion condition indicative of the completion of the early activation control is satisfied.

That is, the activation determination unit 406b is configured to determine that the exhaust gas sensor is in the active state when all the temperature rise condition, the evaporation time condition, and the early-activation completion condition are satisfied and the activation-control time condition for eliminating the influence of hydrogen resulting from the early activation control is satisfied.

This makes it possible to determine whether the exhaust gas sensor is in the active state in accordance with the influence of hydrogen resulting from the early activation control, thus performing an early activation determination of the exhaust gas sensor using the effects of the early activation control.

The NOx sensor 24 of the present embodiment includes the monitor cell as the second cell for detecting the concentration of residual oxygen remaining in the measurement target gas generated by removing oxygen from the target exhaust gas by the operation of the first cell.

The activation determination unit 406b is configured to determine that the NOx sensor 24 is in the active state when, after the satisfaction of the temperature rise condition, the output of the monitor cell indicates the elimination of the influence of hydrogen, instead of the satisfaction of the activation-control time condition.

The elimination of the influence of hydrogen is confirmed by the monitor cell, making it possible to determine the active state of the NOx sensor 24 in an earlier and more accurate manner.

The activation determination unit 406b of the present embodiment is configured to determine that an abnormality has occurred in the NOx sensor 24 upon determining that the temperature rise condition is not satisfied even after a lapse of the predetermined period.

It is possible to determine that there is an abnormality in the NOx sensor 24 upon determination that the lack of satisfaction of the temperature rise condition within the predetermined period, making it possible to perform the abnormality determination without wasting time.

In the present embodiment, the temperature rise condition is determined depending on whether the admittance or impedance at the time of application of the AC voltage in at least one of the first parameter and the second parameter has exceeded the predetermined threshold.

The method for determining the temperature rise condition is however not limited to this.

For example, respective thresholds may be set corresponding to the first parameter and the second parameter such that the temperature rise condition is determined depending on whether the first parameter and the second parameter have exceeded their respective thresholds.

This method enables the temperature rise determination to be performed based on both the first parameter and the second parameter, making it possible to determine the active state of the NOx sensor 24 in a reliable manner.

For example, the NOx sensor 24 of the present embodiment is interposed between the diesel oxidation catalyst converter 22 and the urea addition injector 26, and the NOx sensor 30 is disposed downstream of the SCR catalyst converter 28. As a first modification, a lean NOx trap (LNT) may be provided as an NOx storage reduction catalyst upstream in the flow direction of the diesel oxidation catalyst converter.

The LNT is formed of an NOx storage material and a ceramic carrier. When the engine is in the lean state, the LNT temporarily stores NOx from the exhaust gas in the NOx storage material made from an alkali metal such as potassium or an alkali earth metal such as barium to bring the engine into the rich state, thereby to supply HC into the exhaust gas and release the stored NOx. Then, the released NOx is reduced by the function of the SCR catalyst converter provided downstream.

According to this configuration, another NOx sensor can be provided upstream of the LNT. That is, the NOx sensors can be provided upstream of the NOx storage reduction catalyst, between the diesel oxidation catalyst converter 22 and the urea addition injector 26, and downstream of the SCR catalyst converter 28. These NOx sensors are connected to one SCU. In other respects, the modification example is similar to the foregoing embodiment.

According to this configuration, detecting the NOx concentration upstream of the LNT and transmitting the detected NOx concentration from the SCU 40 to the ECU 10 allows the ECU 10 to switch the engine to the rich or lean state.

On the other hand, the NOx sensor upstream of the LNT is exposed to many other gases because the exhaust gas discharged from the engine does not pass through the reduction catalyst and the like in many cases, and the detection by the NOx sensor is greatly influenced by the other gases. Therefore, at the activity determination of the NOx sensor upstream of the LNT in the example, it is necessary to lengthen the time for eliminating the influence of water vapor and/or rich gas on the sensor cell and the monitor cell after the satisfaction of the temperature rise condition corresponding to step S105.

Specifically, in order to apply the present invention to the NOx sensor used upstream of the LNT, it is preferred to set the time condition from the instant at which the first parameter or the second parameter exceeds the activity determination admittance Tha for satisfying the temperature rise condition to the instant at which the activity determination is turned on to be longer than that for the NOx sensor downstream of the LNT. Accordingly, the time for eliminating the influence of water vapor and/or rich gas becomes longer than that for the NOx sensor downstream of the LNT, which makes it possible to determine the activity of the NOx sensor with high accuracy taking into account the influence of the gas impairing the detection accuracy of the NOz sensor.

As a second modification example, the NOx sensor upstream of the LNT in the first modification example can be provided between the LNT and the diesel oxidation catalyst converter. According to this configuration, the NOx sensors can be provided between the LNT and the diesel oxidation catalyst converter, between the diesel oxidation catalyst converter 22 and the urea addition injector 26, and downstream of the SCR catalyst converter 28.

Even according to this configuration, the NOx sensor is greatly influenced by other gases because the exhaust gas does not pass through the reduction catalyst and the like. Therefore, as in the first modification example, it is preferred to, as for the activity determination admittance Tha for satisfying the temperature rise condition in the NOx sensor provided between the LNT and the diesel oxidation catalyst converter, set the time condition based on the instant at which the first parameter or the second parameter exceeds the admittance Tha for the determination to the instant at which the activity determination is turned on to be longer than that for the NOx sensor between the diesel oxidation catalyst converter 22 and the urea addition injector 26 or that for the NOx sensor downstream of the SCR catalyst converter 28.

Accordingly, the time for eliminating the influence of water vapor and/or rich gas becomes longer than that for the NOx sensor between the diesel oxidation catalyst converter 22 and the urea addition injector 26 or that for the NOx sensor downstream of the SCR catalyst converter 28, which makes it possible to determine the activity of the NOx sensor with high accuracy taking into account the influence of the gas impairing the detection accuracy of the NOx sensor.

The present embodiment has been described with reference to the specific examples. However, the present disclosure is not limited to the examples. Appropriate modifications may be made to the specific examples as would be obvious to a person skilled in the art without departing from the scope of the present disclosure, as long as the modified examples include the features of the present disclosure. Appropriate modifications may be made to the components of the specific examples and the arrangements, conditions, and shapes thereof. Appropriate changes may be made to the combination of the components of the specific examples unless a technical inconsistency arises therefrom.

What is claimed is:

1. A control apparatus for an exhaust gas sensor, comprising:
a temperature rise determination unit configured to:
acquire at least one of:
a first parameter indicating a temperature of a first cell for removing oxygen from an exhaust gas discharged from an internal combustion engine; and
a second parameter indicating a temperature of a second cell for detecting a measurement target component contained in a measurement target gas generated by removing the oxygen from the exhaust gas by an operation of the first cell; and
determine whether a temperature rise condition of at least one of the first cell and the second cell is satisfied in accordance with whether the at least one of the first parameter and the second parameter has exceeded a corresponding at least one temperature threshold; and an activation determination unit configured to:
determine, based on whether a time condition corresponding to the temperature threshold is satisfied, whether the exhaust gas sensor is in an active state in which the exhaust gas sensor is capable of performing a measurement operation with at least a predetermined accuracy; and
determine that the exhaust gas sensor is in the active state upon, after the temperature rise condition is determined to be satisfied, the time condition corresponding to the temperature threshold being satisfied.

2. The control device according to claim 1, wherein
the at least one temperature threshold comprises a first temperature threshold for the first parameter, and a second temperature threshold for the second parameter; and
the temperature rise determination unit is configured to:
acquire the first parameter and the second parameter;
determine whether the temperature rise condition of the first cell is satisfied in accordance with whether the first parameter has exceeded the first temperature threshold; and
determine whether the temperature rise condition of the second cell is satisfied in accordance with whether the second parameter has exceeded the second temperature threshold.

3. The control device according to claim 1, wherein:
at least one of the first parameter and the second parameter is an admittance or an impedance of the corresponding at least one of the first cell and the second cell during an application of an alternating voltage to the corresponding at least one of the first cell and the second cell.

4. The control device according to claim 1, further comprising:
a period setting unit configured to set a predetermined period for determining whether the time condition is satisfied, in accordance with a time interval from a start of energization of the first and second cells to a time at which the temperature rise condition is satisfied.

5. The control device according to claim 1, further comprising:
a period setting unit configured to set a predetermined period for determining whether the time condition is satisfied, in accordance with at least one of:
an environment condition in which the exhaust gas sensor is provided; and
an operating condition of the internal combustion engine.

6. The control device according to claim 1, further comprising:
an early activation unit configured to:
execute early activation control to temporarily increase a voltage to be applied to the first cell at start-up of the internal combustion engine;
determine an early-activation completion condition on which the early activation control is completed; and
determine that the exhaust gas sensor is in the active state upon determining that:
all the temperature rise condition, the time condition, and the early-activation completion condition are satisfied; and
an activation-control time condition for eliminating influence of hydrogen resulting from the early activation control is satisfied.

7. The control device according to claim 6, wherein:
the exhaust gas sensor has, as the second cell, a monitor cell for detecting concentration of oxygen contained in the measurement target gas generated by removing the oxygen from the exhaust gas by the operation of the first cell; and
the activation determination unit is configured to determine that the exhaust gas sensor is in the active state upon determining that, after the temperature rise condition is satisfied, an output of the monitor cell indicates that the influence of hydrogen is eliminated, instead of satisfaction of the activity control time condition.

8. The control device according to claim 1, wherein:
the time condition is preset to ensure a time for eliminating the influence of water vapor and/or rich gas on the second cell after satisfaction of the temperature rise condition.

9. The control device according to claim 1, wherein:
the activation determination unit is configured to determine that an abnormality has occurred in the exhaust gas sensor upon determining that the temperature rise condition is not satisfied even after a lapse of a predetermined period.

* * * * *